Figure 1:
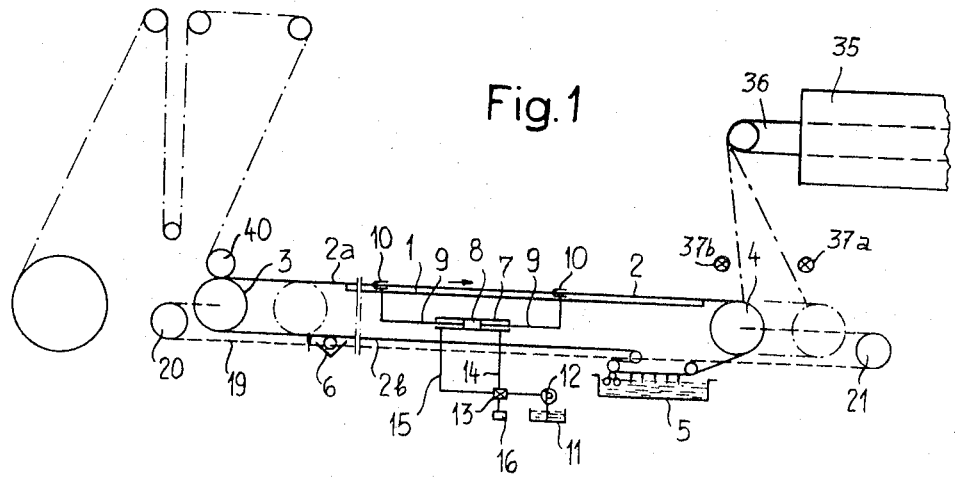

March 14, 1967     H. VOEGELIN     3,308,750
INTERMITTENT PRINTING OF WEB ON CONVEYOR BELT
Filed Sept. 17, 1964

INVENTOR.
Heinrich Voegelin
BY
Cushman, Darby & Cushman
ATTORNEYS

United States Patent Office 3,308,750
Patented Mar. 14, 1967

3,308,750
INTERMITTENT PRINTING OF WEB ON CONVEYOR BELT
Heinrich Voegelin, Wiler, near Utzensdorf, Switzerland, assignor to Fritz Buser A.G., Wiler, near Utzensdorf, Switzerland, a corporation of Switzerland
Filed Sept. 17, 1964, Ser. No. 397,246
Claims priority, application Switzerland, Sept. 18, 1963, 11,517/63
8 Claims. (Cl. 101—126)

The present invention relates to the art of printing machines such as film or screen printing machines, for example as in U.S. patents Gerner 1,821,302, Buser 2,540,862, Marek et al. 2,612,835, and Laupman 2,758,540. Reference is also made to my copending, now abandoned, applications Ser. No. 271,385 entitled Adhering Web to Printing Machine and filed April 8, 1963, and Ser. Nos. 397,247 and 397,245 both filed Sept. 17, 1964 and entitled, Apparatus for Moving Conveyer Belt.

In the case of film or screen printing machines, or textile or web which is supposed to receive the imprint is guided by means of a conveyer belt across a printing table. This movement takes place intermittently since the printing has to be carried out during the time that the web is at a standstill. The periodic movement, in the case of several printing machines of this kind, is produced through advancing elements, which for example have been connected frictionally on both sides of the printing table to the conveyer belt, in order to move it by one unit length. For the drive of the advancing elements there may be provided a piston which can slide within a cylinder and which can be acted upon by pressure oil, said piston being in constant connection with the advancing elements. A specific type of advancing element and drive therefor are described and claimed in my aforesaid applications Ser. Nos. 397,247 and 397,245.

In the past, the periodic movement of the web that is to be printed on has brought about the fact that during the intermittent movement not only the whole conveyer belt but also all elements in contact with it, such as for example the reversing rollers of the same as well as the rollers of the device for applying glue and of the washing arrangement, have to be accelerated and decelerated. Therefore, a relatively large mass has had to be accelerated from the standing still position and then has to be retarded to the standing still position, during which time the intermittent movement has to be carried out in the shortest possible time or with the greatest possible speed in order to achieve good economy in the operation of the machine. Because of all this, great driving forces have been needed for the intermittent operation. Beyond that, the possibility has also existed that a result of this intermittent operation, deformations or sag in the conveyer belt may result which under certain circumstances would impair the precision of the printing. Another disadvantage of the prior intermittent operation is that the effectiveness of the rollers, which are in contact with the conveyer belt and which are used for application of the glue and for the washing process, changes depending on whether the conveyer belt is at a standstill or is in motion. In many cases, too heavy an application of glue to the conveyer belt takes place when the belt is at a standstill, a fact which has an unfavorable effect with regard to the evenness of the print later on when the web secured to the belt by that glue is being printed on.

It is then the main object of this invention to create a printing machine in which the above mentioned disadvantages are avoided.

The printing machine according to this invention includes an endless conveyer such as a belt for carrying the web which is to be printed on, the web is carried thereby periodically over a printing table. Advancing agents for the periodic movement have an intermittent frictional effect on the upper strip or part of the belt which moves across rollers which have been mounted rotatably at both ends of the printing table. This machine is especially characterized by the fact that both rollers can be slid in parallel at a constant distance one from the other and both together in the longitudinal direction of the printing table forwardly in response to forward movement of the belt and then rearwardly while the upper part of the belt stops for the printing process. Driving agents are in an effective connection with the lower conveyer belt part or extent in order to keep the lower part in constant movement while shifting the rollers.

Figure 2:
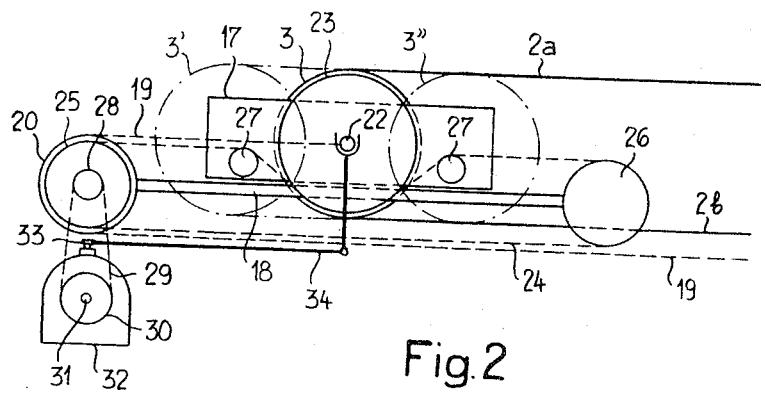

The drawing presents an exemplary arrangement according to the invention:
 FIG. 1 shows a schematic presentation of the driving arrangement in elevation, and
 FIG. 2 shows a detail at an enlarged scale.

Number 1 in FIG. 1 designates the printing table of a film printing machine which has been arranged fixed in a known manner. A printing conveyer or belt 2 which winds around two opposite end rotatable elements such as rollers 3 and 4, extends with its upper part 2a across the surface of the table 1, in order to be supported by the latter during the printing. The lower conveyer part 2b passes below the table 1 through a washing installation, which has been altogether designated by 5, as well as through a glue application device 6. The web to be printed as supplied to the conveyer belt via roller 40 and is adhered to the belt by the glue in known manner, for example as in my aforesaid application Serial. No. 271,385. The web may be removed from the belt at any desired place but it is preferably pulled off the conveyer near the left hand end position of roller 4 by a dryer conveyer arranged above such end position. Preferably the glue used to adhere the belt and web is soluble as in my said application Serial No. 271,385, and in any event washing station 5 can dissolve it and clean the conveyer belt of glue, thereby readying it for a fresh application of glue at station 6.

A piston 8 which has transporting and driving elements 10 set on rods 9 and which can be shifted within a cylinder 7, causes the driving elements 10 to operate on the upper conveyer past 2a for intermittently advancing the conveyer belt a predetermined distance each time. The driving elements establish a releasable frictional connection with the belt 2 during the advance movement of the piston 8. The elements 10 can be, e.g. hydraulically or magnetically operated tongs, or suction shoes as in my aforesaid application Ser. No. 397,247. Shifting of the piston 8 within cylinder 7 takes place through alternate impingement on its two sides of pressurized oil. This oil is transported through a pump 12 from a tank 11 and is fed to the cylinder 7 by a reversing valve via the valve 13 and lines 14 and 15. The reversing valve is controlled by a servo element 16 which, for example, is time controlled.

Differing from known printing machines of this type, the rollers 3 and 4 have not been arranged stationary, but they are shiftable, in relation to the table in a plane which is parallel to the printing table, from the rear end position shown in full lines into the forward end position drawn with dash lines. This shiftability has been assured through the fact that each roller is mounted in a carriage 17 (FIG. 2), which is guided, for example, by means of rollers not shown, on rails 18 (only one has been illustrated) in a manner shown in detail. The rails are attached to the frame of the machine in a position parallel to the printing table. In order to keep the belt 2 tensed despite the shiftability of the rollers, the carriages 17 have been connected with one another by means of a chain 19, which is guided across reversing wheels 20 and 21. It is also possible to provide one chain 19 on each side of the machine. However, instead of that, it is also possible to add to the carriages 17 drawing elements such as springs which have the tendency to pull the carriages at opposite ends in opposite directions.

As becomes clear from FIG. 2, roller 3 is carried on an axle journal 22 with a sprocket wheel 23 which is rotationally, rigidly connected with the axle journal, and whose diameter corresponds approximately to the diameter of the roller. The sprocket wheel 23 meshes with an endless gear chain 24, which is guided across chain wheels 25 and 26 and which is held through rollers 27 in an engaging position with gear 23. Whereas rollers 27 are mounted rotatably on carriage 17, the mounting of the chain wheels 25 and 26 is in the frame of the machine. A chain wheel 28 located on the same axle as the chain wheel 25 is connected rotationally, rigidly with the latter, and is connected with a chain wheel 30 via a chain 29. Chain wheel 30 is located on the driven shaft 31 of a continuously, variable drive 32. The drive 32 causes roller 3 to be shifted rearwardly and is in turn connected with an electric motor, not shown, which is constantly in action during the operation of the machine. The r.p.m. that occur on the driven shaft 31, and which can vary from zero to maximum will depend on the position of the regulating element 33 on the drive 32. The position of this regulating element is governed by the position of the carriage 17 and roller 3 during the shifting of the roller between the two end positions which may be designated the rearward and forward positions shown in dash dot line presentations 3' and 3".

Rollers 3 and 4 automatically roll forward from position 3' to position 3" each time elements 10 advance the belt since the teeth of sprocket 23 mesh with the chain track 24 which is stationary initially during that advance and the speed of the lower conveyor part 2b is less than the speed of the elements 10. The carriage 17, for the purpose of transferring the shifting movement is flexibly connected through a rod system 34 with the regulating element 33, which for example is formed by an arm. In the position of carriage 17 and roller 3, shown in full lines, the latter is approximately at the half way mark of its shifting movement or of that of the roller between the end positions 3' and 3"; correspondingly the r.p.m. of the driven shaft at this moment is about max./2. Correspondingly, the chain 24 will be driven via the chain wheels 30, 38 and 25 at a mean value in a counterclockwise direction, thereby rotating roller 3 clockwise and moving it rearwardly.

The roller 3 will only reach the position 3', whenever the machine is stopped; at the same time the regulating element will be moved into a position of zero speed through the rod system 34, so that both the driven shaft 31 and the chain 24 too will come to a stop.

The operation of the machine with driving arrangement just described for the constant movement of the lower belt part 2b takes place in principle in such a manner, that during the period of stopping of the upper part 2a, a certain definite length of the belt is transported each time from the delivery (right) side of the upper part to the feed (left) side of the same, and this is through a rearward shifting of the rollers 3 and 4 from the dash dot indicated position shown in FIG. 1 into the solid line position. On the other hand, through the forward movement of the rollers 3 and 4 during the intermittent movements of the upper belt strip 2a, a part of the length of the belt needed by the lower strip 2b is compensated for by the fact that the rollers are shifted in the same direction during this movement. Thus, it is possible to keep the speed of the lower belt strip during the periodic movement of the upper strip at a considerably lower rate than the speed of the upper strip in itself would require.

This arrangement has the advantage that no part of the belt along the washing arrangement or along the arrangement for the application of glue comes to a standstill so long as the machine is in operation, and that the propulsive output needed in toto for the movement of the belt will be smaller than if the lower belt strip would also be at rest during the periods of standstill between the periodic movements. Still a further advantage is that the feeding of the web on the input side can also take place in a steady rather than intermittent manner if reversing roller 40 is shifted back and forth together with the roller 3 as by mechanical interconnection thereof.

Numerous variations are possible. For example, instead of connecting rollers 20 and 21 with one another through chains 19, a connection by means of rods is also possible. The drive, it is true, takes place preferably on the feed side or on the roller 3 which has been provided there. It is also possible to drive the roller directly, that is to say without any chain transmission, by placing the driving motor, for example, on the carriage.

The continuous drive of the lower strip of the conveyor belt of the film printing machine just described, will permit also the guidance of the printed web continuously through a drying arrangement generally indicated at 35 (FIG. 1) placed behind and above the printing machine. For this purpose, it will be possible to use a drying installation which also has a conveyor belt 36, which is driven synchronously with the lower strip of the conveyor belt 2 of the printing machine. The drive for the dryer conveyor can be taken for example from the driven shaft 31 of the drive 32, or from the constant speed web supply or draft roll in FIG. 1, and can be transferred through a connecting shaft to the conveyor belt of the drying arrangement. As a result of this, one can achieve a more even drying of the printed web and a prolongation of the drying time at the same delivery speed. The speed of the dryer conveyors may be governed by a photocell control arranged in the path of the web pulled from printing conveyor 2 to increase dryer conveyor speed by means of a variable gear, for example, if web pull off point moves to right and to reduce speed of the web pull off point moves left. It will be understood that the web adheres with some force to the belt 2a. When upper belt part 2a carries out its step movement it will move the take-off point of the web to the right by an amount governed by the speed of the conveyor belt 2 on the one hand and the speed of the dryer belt 36 on the other hand. If the web is pulled off the conveyor 2 with insufficient speed and therefore the take-off point will travel into the range of photocell 37a this will cause the ratio setting of the variable gear for the dryer to be changed to increase the speed of the latter. Consequently prior to the successive stepwise movements of the upper belt part 2a the take-off point of the web will have moved more and more towards the left. The web will finally travel through the range of photocell 37b and consequently a signal will be generated to decrease the speed of conveyor belt 36 via the variable gear thereof. Of course the speed of conveyor belt 36 will always be substantially equal to the average delivery speed of conveyor 2 but it will be able by means of the photocell control described, to compensate for elongations or contractions of the web due to the influence of printing.

What is claimed is:

1. In a web printing machine of the type which has an endless conveyor trained around two rotatable elements respectively at opposite ends of the conveyor for carrying a web to be printed via the upper part of the conveyor to and from a printing table and in which there are means operative on the said upper conveyor part for advancing said part intermittently with intervening stops of given duration for printing onto said web, the improvement of apparatus for constantly moving the lower conveyor part, which is between said rotatable elements, notwithstanding intermittent movement of said upper conveyor part, characterized by said rotatable elements being bodily movable in unison with constant parallel spacing in forward and reverse directions, and comprising:

means for bodily moving said rotatable elements forward as aforesaid a predetermined distance as said upper conveyor part advances, and means responsive to the forward movement of said rotatable elements for rearwardly moving said rotatable elements bodily as aforesaid for said predetermined distance while said upper conveyor part is stopped.

2. A machine as in claim 1 including two chain wheels fixedly disposed outwardly of the outer end positions respectively of said rotatable elements, and a chain reversedly trained around said wheels and connected tautly at opposite ends respectively to said rotatable elements for purposes of keeping said upper conveyor part tensed.

3. A machine as in claim 1 wherein said rotatable element forward moving means causes said rotatable elements to roll forward said predetermined distance in response to pull on said upper conveyor part by said advancing means.

4. A machine as in claim 3 wherein at least one of said rotatable elements has teeth about its periphery, said forward and rearward moving means including a track with which said teeth mesh, said track being lengthwise movable only to effect the said rearward bodily movement of said rotatable elements, 5. A machine as in claim 4 including drive means connected to drive said track, and thereby said elements, rearwardly said predetermined distance after said elements have been rolled forwardly said distance as aforesaid.

6. A machine as in claim 1 wherein said rearward moving means includes a variable speed rotatable element drive connected to at least one of said rotatable elements for varying the speed of said drive from substantially maximum when said elements are at their forwardmost position to substantially zero when said elements are at their rearwardmost position.

7. A machine as in claim 6 wherein said forward and rearward moving means includes two spaced chain wheels and an endless chain trained about said wheels, one of said wheels being connected to said variable drive, said one rotatable element having peripheral teeth continuously meshing with said chain, and linking arm means connected between said drive and said one rotatable element to regulate rearward drive speed according to the position of said one element, pull on said upper conveyor part by said advancing means being effective to roll said one rotatable element forward by virtue of the said meshing chain and teeth.

8. A machine as in claim 7 wherein said one rotatable element is the rearwardmost one of said elements.

References Cited by the Examiner

UNITED STATES PATENTS

| | | | |
|---|---|---|---|
| 809,241 | 1/1906 | Bechman | 101—291 |
| 1,941,597 | 1/1934 | Cavagnaro | 101—288 X |
| 2,529,777 | 11/1950 | McInnis | 198—135 |
| 2,705,453 | 4/1955 | Nield | 101—292 X |
| 3,203,533 | 8/1965 | Hauer et al. | 198—110 X |

ROBERT PULFREY, *Primary Examiner.*

H. P. EWELL, *Assistant Examiner.*